(12) United States Patent
Brenner et al.

(10) Patent No.: US 7,005,077 B1
(45) Date of Patent: Feb. 28, 2006

(54) SHIPBOARD HUMAN WASTE TREATMENT FOR REMOVING SOLIDS

(76) Inventors: Samuel L. Brenner, 300 Three Islands Blvd., Apt. 218, Hallandale Beach, FL (US) 33009; John D. Vincent, 6185 S.W. 56th St., Davie, FL (US) 33314

( * ) Notice: Subject to any disclaimer, the term of this patent is extended or adjusted under 35 U.S.C. 154(b) by 0 days.

(21) Appl. No.: 10/907,797

(22) Filed: Apr. 15, 2005

Related U.S. Application Data

(60) Provisional application No. 60/580,223, filed on Jun. 15, 2004.

(51) Int. Cl.
*C02F 1/00* (2006.01)
*C02F 11/12* (2006.01)

(52) U.S. Cl. .............. 210/770; 210/808; 210/251; 210/406; 210/415; 210/416.1; 100/117; 141/12; 4/449; 4/256.1; 4/DIG. 9

(58) Field of Classification Search ................ None
See application file for complete search history.

(56) References Cited

U.S. PATENT DOCUMENTS

| | | | | |
|---|---|---|---|---|
| 1,303,358 A | * | 5/1919 | Montgomery | 4/317 |
| 3,024,468 A | * | 3/1962 | Burn | 4/431 |
| 3,054,117 A | * | 9/1962 | Cella | 4/321 |
| 3,079,612 A | * | 3/1963 | Corliss | 4/317 |
| 3,098,144 A | * | 7/1963 | Dale | 4/111.2 |
| 3,154,795 A | * | 11/1964 | Burn | 4/431 |
| 3,522,613 A | * | 8/1970 | Botsford | 4/111.5 |
| 3,536,196 A | * | 10/1970 | Zeff | 210/97 |
| 3,593,346 A | * | 7/1971 | Katona | 4/312 |
| 3,634,891 A | * | 1/1972 | Kemper | 4/317 |
| 3,655,048 A | * | 4/1972 | Pergola | 210/608 |
| 3,673,614 A | * | 7/1972 | Claunch | 4/314 |
| 3,720,962 A | * | 3/1973 | Harrah | 4/435 |
| 3,734,852 A | * | 5/1973 | Borden | 210/175 |
| 3,787,901 A | * | 1/1974 | Wagner et al. | 4/320 |
| 3,829,909 A | * | 8/1974 | Rod et al. | 4/318 |
| 3,835,478 A | * | 9/1974 | Molus | 4/314 |
| 3,882,552 A | * | 5/1975 | Turner | 4/318 |
| 3,922,730 A | * | 12/1975 | Kemper | 4/316 |
| 3,950,249 A | * | 4/1976 | Eger et al. | 210/104 |
| 3,974,075 A | * | 8/1976 | Saigh et al. | 210/86 |
| 3,994,628 A | * | 11/1976 | Kemper | 417/12 |
| 3,995,328 A | * | 12/1976 | Carolan et al. | 4/316 |
| 4,012,322 A | * | 3/1977 | Saigh et al. | 210/86 |
| 4,053,399 A | * | 10/1977 | Donnelly et al. | 210/706 |
| 4,063,315 A | * | 12/1977 | Carolan et al. | 4/316 |
| 4,222,130 A | * | 9/1980 | Roberts | 4/321 |
| 4,324,007 A | * | 4/1982 | Morris | 4/321 |

(Continued)

*Primary Examiner*—Robert James Popovics
(74) *Attorney, Agent, or Firm*—Malin, Haley & DiMaggio, P.A.

(57) ABSTRACT

A method and system for separating human waste solids from liquid for a shipboard toilet system that allows for the separation of solid waste, compaction of the solid waste and storage of solid waste. Wastes are deposited into a shipboard toilet system that uses vacuum toilets to flush waste into a large, inclined solid waste separation tank. A vacuum pump is attached to the separation tank to maintain negative pressure within the tank and system and to move the separated liquid stream. The separation tank has a separating screen disposed across its entire width to retain solid wastes while allowing liquid to flow through. After separation from liquids, solid waste material is compacted and dewatered with a helical screw through an inclined tube, and packaged for later removal as landfill or burned in the ship incinerator.

6 Claims, 2 Drawing Sheets

U.S. PATENT DOCUMENTS

| | | | |
|---|---|---|---|
| 4,332,041 A * | 6/1982 | Kristoffersen | 4/316 |
| 4,488,963 A * | 12/1984 | Hellers | 210/170 |
| 4,521,925 A * | 6/1985 | Chen et al. | 4/362 |
| 4,546,502 A * | 10/1985 | Lew | 4/449 |
| 4,783,859 A * | 11/1988 | Rozenblatt et al. | 4/316 |
| 4,819,279 A * | 4/1989 | Sigler et al. | 4/300 |
| 4,865,631 A * | 9/1989 | Stroby et al. | 4/321 |
| 5,007,117 A * | 4/1991 | Oldfelt et al. | 4/432 |
| 5,035,011 A * | 7/1991 | Rozenblatt et al. | 4/665 |
| 5,080,797 A * | 1/1992 | Volkner | 210/652 |
| 5,084,920 A * | 2/1992 | Kimball | 4/665 |
| 5,090,242 A * | 2/1992 | Hilton | 73/302 |
| 5,133,853 A * | 7/1992 | Mattsson et al. | 210/104 |
| 5,265,544 A * | 11/1993 | Bigelow et al. | 110/345 |
| 5,372,710 A * | 12/1994 | Frank | 210/117 |
| 5,707,027 A * | 1/1998 | Hiesener | 244/118.5 |
| 5,711,038 A * | 1/1998 | Niethammer et al. | 4/317 |
| 5,843,304 A * | 12/1998 | Marchesseault et al. | 210/143 |
| 6,101,641 A * | 8/2000 | Hawkins et al. | 4/484 |
| 6,112,338 A * | 9/2000 | Sundberg | 4/449 |

* cited by examiner

SHIPBOARD HUMAN WASTE TREATMENT FOR REMOVING SOLIDS

FIELD OF THE INVENTION

This invention relates generally to a method and system for use on a ship for the removal of human waste and, in particular, to a method and system for the separation, treatment and removal of solid human waste and other solid materials found in the shipboard black water sanitary waste system, thereby significantly reducing the biological oxygen demand (BOD) loading on any shipboard advanced marine sanitation device.

DESCRIPTION OF RELATED ART

In recent times, large ships, such as ocean-going cruise liners, have experienced difficulties in meeting the local environmental black water discharge standards of certain bodies of water around populous ports and any areas within the twelve-mile territorial limit of the United States because of increased pollution problems caused by overflow or discharge of human waste. This results from the large amount of human waste black water effluent generated by hundreds or even thousands of passengers aboard each ship. Many states and the federal government have passed environmental protection laws to prohibit large ships from discharging any effluent within the twelve-mile limit. Additionally, the dumping of plastics at sea is illegal. What is needed is a low cost, non-complex system that addresses the problems caused by human waste treatment aboard ship. The present invention provides a method and system that separates solids in black water effluent and dewaters the solids so that the solids can be either stored for later removal as landfill or burned in the ship incinerator.

SUMMARY OF THE INVENTION

A method and system for treating human waste aboard ship, which includes a human waste solid-liquid separator that can be maintained under a vacuum, a collection tank that collects the separated waste solids while the separated liquids are directed to the shipboard advanced marine sanitation device (AMSD) liquid treatment system generally using a vacuum pump, and a solid waste compacter that allows the solid waste products to be compacted into a non-liquid, easily storable and removable solid material for later removal as landfill or burned in the ship incinerator.

The system includes a first large separating tank that receives all human waste and debris (liquid and solids) directly from the vacuum toilet systems aboard ship. Note that this waste would also include plastic items or other undesirable items that are flushed periodically down a toilet. The large separating tank includes at least one internal screen that allows virtually all solids to be separated from the liquids that flow through the screen into removal conduits that have vacuum pumps for effluent stream transfer. Removal of these solids significantly reduces the load and wear on the vacuum pumps in the shipboard waste treatment system so that the vacuum pumps do not clog, run more efficiently and maintain functionality longer. The solids and the liquids that are the input from the toilet system are received into the large separation tank which is maintained under vacuum. Once separated, the solid waste output from the separation tank goes directly into an interim built-in storage tank for the solid waste that is separated from the separation tank by an upper first valve that is immediately closed whenever the built-in interim tank is full of solid waste in order to maintain the vacuum in the separating tank. The interim storage tank that contains waste solids also is connected directly through a second lower valve to the input of a waste compactor that has a motor-driven helical screw, which compresses the solid waste into a very compact, dewatered material with liquids being entirely removed during the compacting process. The waste storage tank output leads directly into the compactor input through a valve that allows the transfer of the solid waste materials into the compactor at particular times when the valve is opened without breaking the vacuum. When the valve is closed, the compactor is turned on and the materials are compressed into a large receiving tube that contains the compressed waste materials and is inclined vertically. The receiving tube is angled at approximately 45 degrees vertically and includes a reversal tube at its open end that allows the compressed, non-liquid waste materials to be dumped directly into combustible storage bags, such as plastic bags.

The compaction process is continuous wherein the toilet system is connected directly to the separation tank and is continuously admitting waste materials into the separation tank. The separation tank is maintained under negative pressure by the ship's black water vacuum. The bottom of the separation tank has outlet conduits connected to the vacuum pump that allow the liquids separated by the filter screens inside the separation tank to be removed and discharged from the separation tank on a continuous basis. A series of air and liquid jets are also used with the separation screen for automatically clearing any accumulated buildup of waste or debris from said separation screen.

The compactor has an electric motor that has automated or manual power switches. The electric motor shaft is connected to a helical blade. A gear may be used to provide more torque and compressive force to the helical blade. The helical blade is mounted in a very solid elongated tube, which may include discharge holes to allow liquids to be squeezed out of the solid waste material into a surrounding housing during compaction. Because of the vertical incline, the compacted waste material is pulled by gravity which aids in compacting the solid waste material. The discharge tube connected to the output of the compact helical blade may be four or five feet long and a foot in diameter. The process may be turned on and off as needed as solid waste collects in the storage tank.

An object of this invention is to provide an improved shipboard human waste treatment for separating solids that include human waste and other deleterious materials placed in the toilet system.

Another object of this invention is to provide a simple, low cost, efficient system for significantly reducing the loading on the shipboard black water treatment system by safely processing, storing, and removing virtually all of the solids out of the human waste stream aboard ship.

Still another object of this invention is to provide a system for processing, storing, and removing wastes aboard ship, which preserves the vacuum pumps that are a component of the shipboard waste treatment system and reduces the load on the existing shipboard waste treatment plant.

In accordance with these and other objects which will become apparent hereinafter, the instant invention will now be described with particular reference to the accompanying drawings.

DETAILED DESCRIPTION

Figure 1:
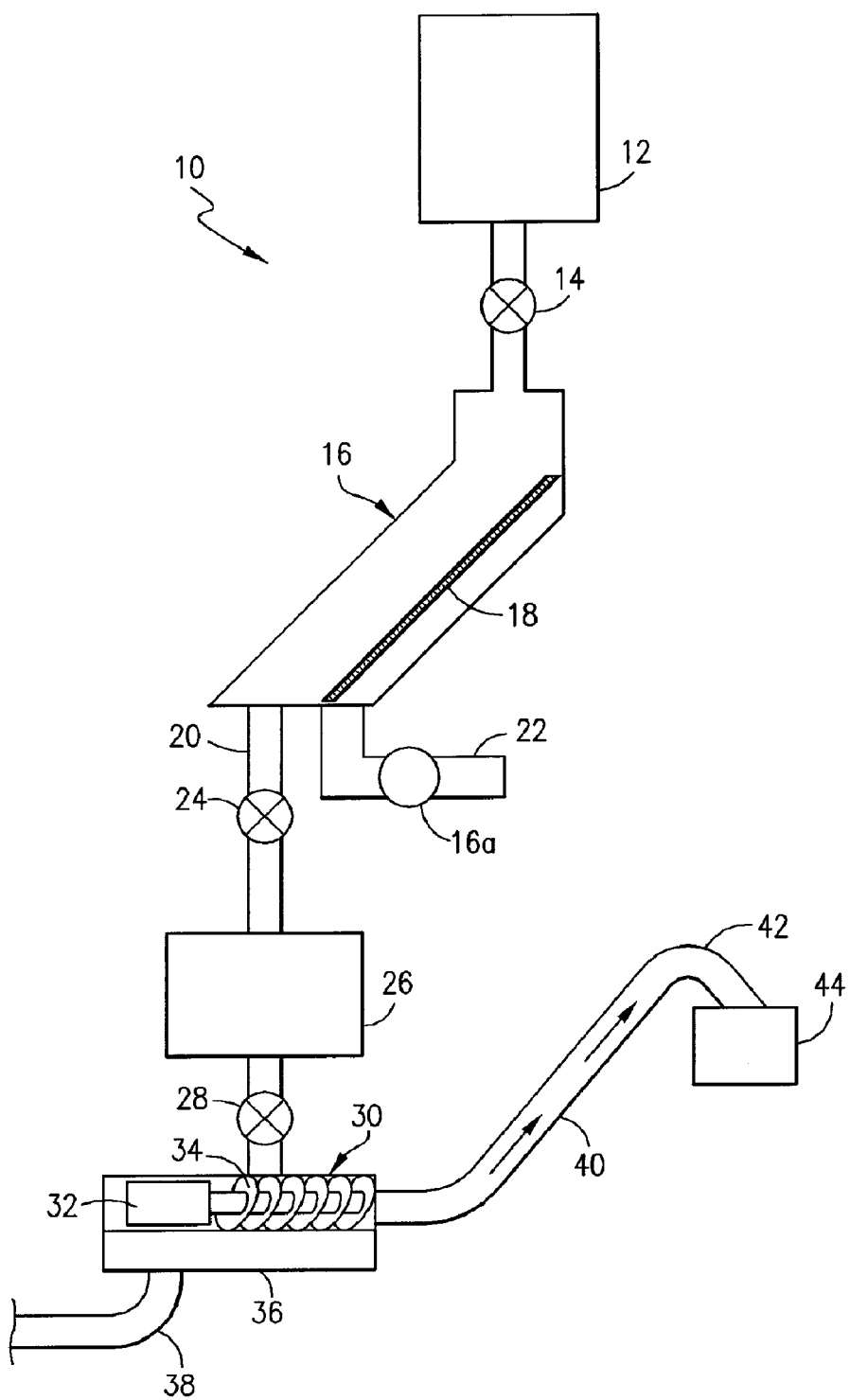
FIG. 1 shows a schematic diagram of the operation of the present invention.
Figure 2:
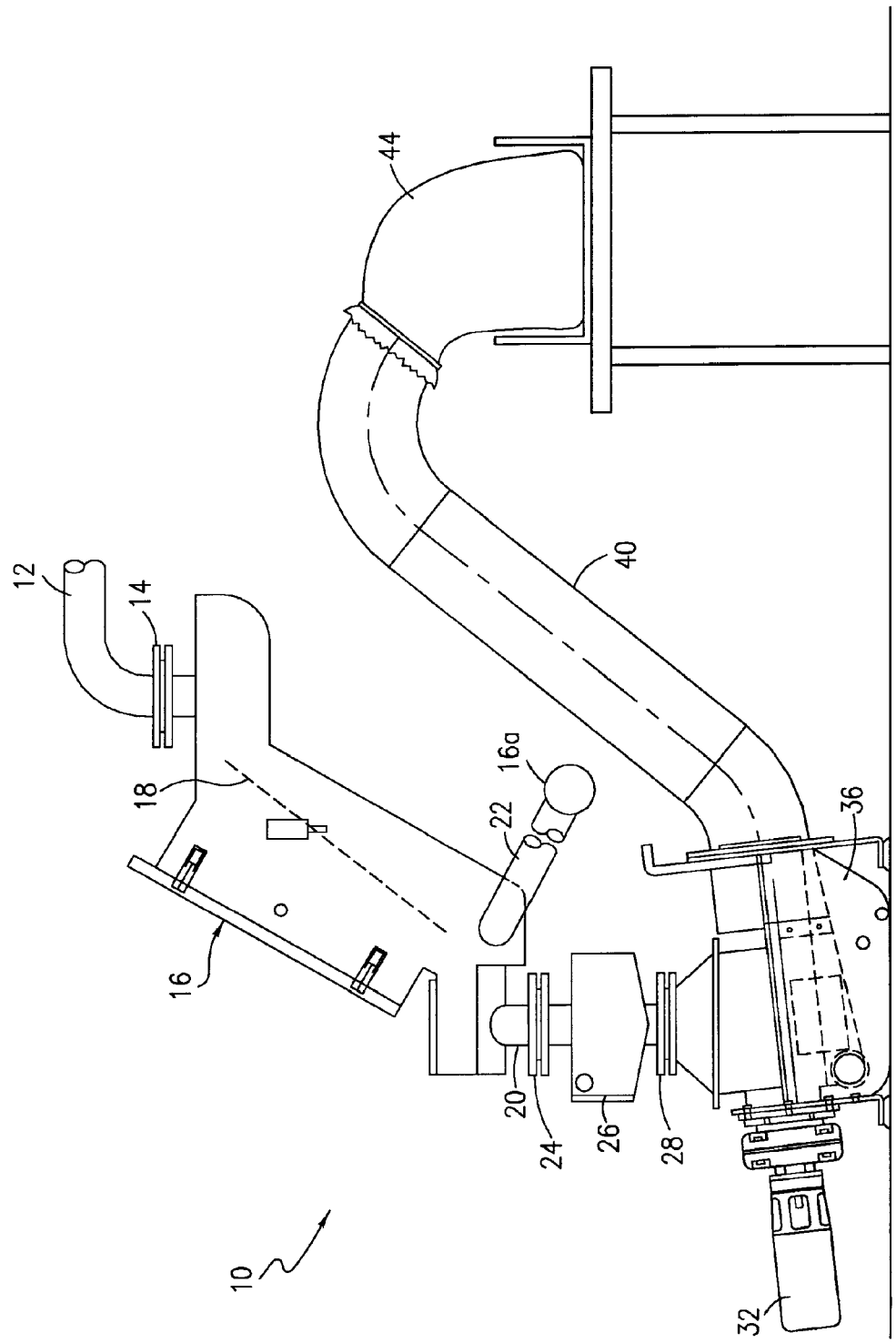
FIG. 2 shows a perspective view of the invention.

Referring now to FIG. 1 and FIG. 2, the present invention is shown generally at 10 schematically comprising a solid waste separation and compaction system that is connected to a shipboard toilet system 12. The toilet system 12 uses vacuum toilets that connect through valve 14 and has an outlet into a solid waste separation tank 16. The system is maintained under vacuum by a vacuum pump 16a connected directly into said separation tank 16. The vacuum pump 16a receives the liquid waste while solid wastes are diverted into the solid waste separation tank 16. By removing all of the solid wastes upstream of the vacuum pump, the vacuum pump 16a functions longer with far less maintenance, and therefore, more efficiently. Separation tank 16 may be a large, inclined stainless steel tank that includes a liquid/solid separating screen 18 disposed across its entire width so that waste solids coming from the toilet system 12 through valve 14 will be separated and maintained apart from all liquids that will pass through screen 18 into a removal conduit 22 which contains liquid only. The solids will continue down through conduit 20 and through valve 24 into a solid waste interim storage tank 26. Thus, waste materials that pass through separation tank 16 include liquid and solid human waste and other objects that are thrown into the toilet system that can be solid or liquid. By using the full screen 18, only solid materials are received into the solid waste interim storage tank 26. The effluent solids in the interim storage tank 26 may still contain a substantial amount of absorbed liquid. When interim tank 26 is full, valve 24 closes. A control valve 28 opens. The control valve 28 separates the interim solid waste storage tank 26 from the compaction chamber 30. The compaction chamber 30 includes a helical compaction blade 34 connected to an electric motor 32 and includes a liquid collection tank 36 that has a liquid output conduit 38. The compacted waste storage tube 40 (outfall chute) has an outlet end 42 and is shown at a 45-degree angle vertically emanating at the end of the compaction screw 34. The interim solid waste storage tank 26 allows solid waste to pass into the compaction chamber 30 when valve 28 is open and valve 24 is closed. During compaction, valve 28 is open and the helical blade 34 is rotated by motor 32 which may include a gear for increased torque. As the solid waste is compacted, it is forced upward into the outfall chute/compaction tube 40. The compaction chamber 30 also includes drain holes through which excess liquid from the compacted solid waste may drain into tank 36. As the material is compacted and pushed upward through the storage tube 40, the compacted waste can be removed through the open end 42 directly into bag 44 for later removal as landfill or to be burned in the ship incinerator.

The primary use for the present invention shown herein is to process large amounts of human waste and other debris flushed down toilets, which accumulates aboard a cruise ship in a short amount of time, into a highly compacted small volume of waste that has been dewatered and that can be either incinerated at sea or taken ashore in compact bundles. Using the method in accordance with the present invention, the human waste is received into the standard shipboard toilet system where it passes into a solid waste separation tank so that all of the solids and liquids are separated at this point using one or more separating screens to capture solid wastes while allowing liquids to drain through. The solids continue to pass into a solid interim storage tank while the liquids are diverted into the existing vacuum pumps for further shipboard treatment. By using a full screen disposed across the entire width of the separation tank, the only materials that pass into the interim storage tank are the solids that are to be removed and dewatered. Next, a substantial amount of additional liquid is removed from the recovered solids using a compactor. Said compactor includes a helical blade and electric motor in a storage tube that is used to further compress the residual waste to extract more moisture and water from the solid waste. By using an inclined storage tube, which includes a reversal outlet end, the dewatered compacted waste can be deposited into storage bags for burning or removal from the ship.

Using the present system, which itself is quite compact, the efficiency of removal and elimination of the black water solids aboard ship significantly reduces vacuum pump and screen maintenance while simultaneously substantially increasing the performance of the existing advanced marine sanitation device (existing waste treatment system).

The instant invention has been shown and described herein in what is considered to be the most practical and preferred embodiment. The applicant recognizes, however, that departures may be made therefrom within the scope of the invention and that obvious modifications will occur to a person skilled in the art.

What is claimed is:

1. A system for treating and removing solid waste from a shipboard toilet system for shipboard human waste disposal comprising:

one or more toilet valves;

a solid waste separation tank;

a shipboard toilet system including one or more vacuum-operated toilets, each of which connects to said toilet valve and to said solid waste separation tank;

a liquid/solid separating screen disposed across the entire width inside said separation tank;

a liquid removal conduit connected to said separation tank to capture liquid that passes through said liquid/solid separating screen mounted within said separation tank;

a vacuum pump connected directly to said liquid removal conduit;

an interim storage tank;

a solid waste conduit connected to said waste separation tank and said interim separation tank to carry solid wastes out of the solid waste separation tank and into the interim storage tank;

an outlet solid waste conduit;

a control valve connected to said outlet solid waste conduit to control solid waste passage;

a solid waste compaction chamber, said compaction chamber having a helical compaction blade;

an electric motor connected to said helical compaction blade for rotating said helical compaction blade;

a liquid collection tank;

a liquid output conduit connected to said liquid collection tank;

a compacted waste storage tube inclined at approximately a 45-degree angle above the horizon connected to said compaction chamber and the output of said helical compaction blade;

said compaction chamber including a plurality of drain holes in the compaction chamber to allow excess liquid to flow into said liquid collection tank during said helical compaction blade movement; and a solid waste collection member connected to the output of said compaction chamber to collect solid waste for removal from said ship.

2. The invention according to claim 1, wherein the helical compaction blade includes a gear for high torque.

3. The invention according to claim 1 including:

a bag mounted at the outlet end of said compaction chamber for collecting solid waste, including human waste, wherein compacted waste is pushed upward through the compacted waste storage tube and into said bag for disposal.

4. The invention according to claim 1, wherein non-human solid waste, such as plastics, can be compacted by said compaction chamber.

5. A method for treating and removing solid human waste from a shipboard toilet system comprising these steps of:

providing aboard ship a plurality of vacuum toilets for human beings;

providing a solid waste separation tank connected to said plurality of vacuum toilets for collecting liquid and solid human waste;

providing a vacuum pump connected directly to said solid waste separation tank for maintaining a negative pressure (vacuum) within said solid waste separation tank;

providing a liquid and solid separating screen within said solid waste separation tank for separating virtually all solid wastes from liquids;

collecting solid waste into an interim storage tank;

transferring the solid waste from the solid interim storage tank into a compaction tube that includes a plurality of holes for removing additional liquid and a helical compaction blade for compressing the solid waste in a compaction chamber;

removing excess liquid from the compacted solid waste through draining holes into a liquid collection tank;

providing an inclined, compacted waste storage tube at the upward end of said compaction blade disposed vertically at an approximately 45-degree angle and an outlet end; and providing a removal bag for collecting the compacted solid waste from the outlet end of the compaction tube for incineration or removal from the ship.

6. The method according to claim 5, wherein non-human solid waste, such as plastic, is compacted by said compaction chamber along with the solid human waste.

\* \* \* \* \*